United States Patent [19]

Machlan

[11] 4,140,506
[45] Feb. 20, 1979

[54] METHOD FOR PROCESSING GLASS IN FORMING FIBERS

[75] Inventor: George R. Machlan, Newark, Ohio

[73] Assignee: Owens-Corning Fiberglas Corporation, Toledo, Ohio

[21] Appl. No.: 841,074

[22] Filed: Oct. 11, 1977

Related U.S. Application Data

[63] Continuation of Ser. No. 785,271, Apr. 6, 1977, abandoned, which is a continuation of Ser. No. 624,518, Oct. 21, 1975, abandoned.

[51] Int. Cl.² .............................................. C03B 37/02
[52] U.S. Cl. ............................................ 65/2; 65/12; 65/30 R
[58] Field of Search ............... 65/2, 3 R, 11 W, 11 R, 65/12, 30 R

[56] References Cited

U.S. PATENT DOCUMENTS

| | | | |
|---|---|---|---|
| 2,908,036 | 10/1959 | Russell | 65/12 |
| 2,921,342 | 1/1960 | Siefert | 65/12 X |
| 3,248,192 | 4/1966 | Millet | 65/12 X |
| 3,276,853 | 10/1966 | Eakins | 65/12 X |
| 3,518,069 | 6/1970 | Cole | 65/12 X |
| 3,540,870 | 11/1970 | Li | 65/12 X |
| 3,600,205 | 8/1971 | Breton | 65/1 X |
| 3,695,858 | 10/1972 | Russell | 65/12 X |
| 3,736,116 | 5/1973 | Russell | 65/2 |
| 3,746,525 | 7/1973 | Kasuga et al. | 65/12 |
| 3,829,301 | 8/1974 | Russell | 65/2 |

Primary Examiner—Robert L. Lindsay, Jr.
Attorney, Agent, or Firm—Ronald C. Hudgens; Harry O. Ernsberger; Greg Dziegielewski

[57] ABSTRACT

The disclosure embraces a method of and apparatus for processing heat-softened mineral material, such as glass, wherein streams of glass flowing from orifices in depending projections of a stream feeder are conditioned for attenuation through the use of metal fin shields for conveying heat away from the streams of glass, the method and apparatus involving the utilization of a moving gas environment between rows of the depending projections at the floor of the stream feeder and above the fin shields to eliminate or minimize the accumulation of compounds of the glass volatiles on the fin shields and to reduce the tendency of the glass to flood the stream flow region of the feeder.

14 Claims, 5 Drawing Figures

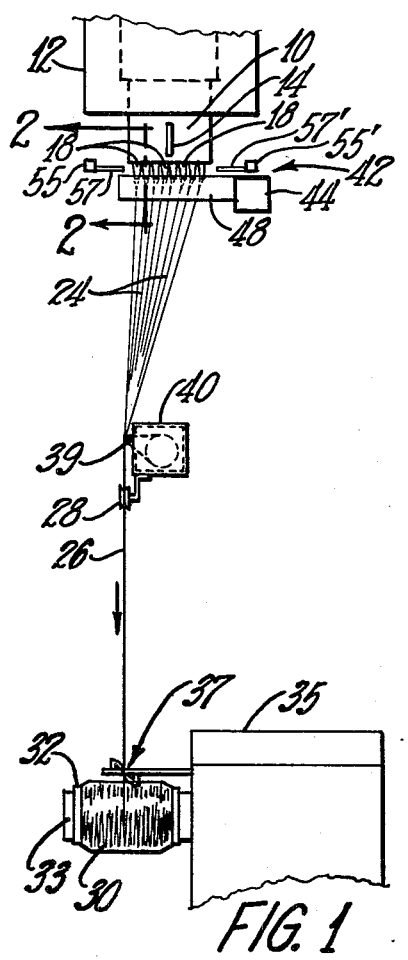

METHOD FOR PROCESSING GLASS IN FORMING FIBERS

This is a continuation of application Ser. No. 785,271, filed Apr. 6, 1977, which in turn is a continuation of application Ser. No. 624,518, filed Oct. 21, 1975, both now abandoned.

The invention relates to the establishment of an environment at the stream flow region of a stream feeder involving the continuous delivery of gas in relatively small amounts to improve the fiber-forming operation by reducing or minimizing the accumulation or build-up of condensed products or compounds from volatiles emitted from the glass and minimizing the tendency for the glass to flood over the stream flow region of a feeder.

Heretofore textile glass compositions have usually included boron and fluorine compounds. The fluorine in the glass tends to minimize the deposition or accumulation of compounds from volatiles emitted from the glass on the metal members or fin shields conventionally employed for conducting heat away from the glass streams to render the glass streams of a viscosity suitable for attenuation to fibers.

By reason of environmental restrictions pertaining to air pollution and contamination, glass compositions for forming textile fibers or filaments are being employed wherein the glass compositions contain boron but little or no fluorine. In employing such fluorine-free glass compositions for forming streams of glass for attenuation to fibers, the major chemical species in the high temperature environment at the stream flow region is boric oxide.

The vapor pressure of boric oxide $B_2O_3$ decreases very rapidly with temperature so that the boric oxide condenses on the fin shields resulting in a comparatively rapid buildup of solid boric oxide on the fin shields. This condition necessates frequent cleaning of the fin shield assembly to remove the accumulated condensation products from the metal fin shields or members.

In the absence of a substance such as a fluoride to reduce the vapor pressure of boric oxide $B_2O_3$, the beads of glass formed at the orifice projections during start-up tend to be large in diameter and comparatively short due to the lower viscosity and surface tension of the glass surface. Such beads of glass contact one another and the metal fin shields causing flooding of the glass over the stream feeder floor surface.

The present invention embraces a method involving supplying a gas in the region above the metal fin shields or members adjacent a glass stream feeder promoting volatilization of boron compounds from the glass and thereby reducing or substantially eliminating condensation of the boron compounds on the fin shields or members.

An object of the invention resides in a method of establishing an environment at the orificed projections on the floor of a glass stream feeder from which flow glass streams for attenuation to fibers including directing streams of gas of low velocities above metal fin shields or members adjacent the glass streams to reduce or minimize the condensation of volatiles from the glass on the metal fin shields or members.

Another object of the invention resides in a method of establishing and maintaining an environment at the stream flow region of a feeder having depending orificed projections through which flow streams of glass associated with fin shield members conveying heat away from the glass streams to render the glass streams suitable for attenuation, the environment including directing streams of gas between rows of the depending projections and above the fin shield members, the gas reacting with volatiles emitted from the glass to reduce or minimize condensation of the volatiles on the fin shield members.

Another object of the invention resides in a method of processing heat-softened glass including flowing streams of glass from orificed projections depending from a stream feeder with which is associated fin shield members for conducting heat away from glass streams flowing from the projections, and flowing streams of a gas, such as water vapor or a mixture of air and hydrogen fluoride, above the fin shield members in relatively small amounts for reducing or substantially eliminating condensation of volatiles from the glass streams on the fin shield members and effecting at the formation at start-up of longer beads of glass of reduced lateral dimension to reduce the tendency for the glass to flood at the stream feeder.

Another object of the invention resides in the use of a glass stream feeder having rows of orificed depending projections through which flow streams of glass for attenuation to fibers in association with means for supplying streams of gas between rows of the depending projections and above the fin shield members effective to reduce the condensation of volatiles emitted from the glass on the fin shields.

Further objects and advantages are within the scope of this invention such as relate to the arrangement, operation and function of the related elements of the structure, to various details of construction and to combinations of parts, elements per se, and to economics of manufacture and numerous other features as will be apparent from a consideration of the specification and drawing of a form of the invention, which may be preferred, in which:

FIG. 1 is a side elevational view of an arrangement for processing glass for the production of continuous glass fibers in accordance with the present invention;

FIG. 2 is an enlarged sectional view of a portion of the stream feeder, the view being taken substantially on the line 2—2 of FIG. 1;

FIG. 3 is a transverse sectional view through the stream feeder and associated components, the view being taken substantially on the line 3—3 of FIG. 2;

FIG. 5 is a fragmentary sectional view of a portion of a stream feeder illustrating the formation of beads of glass at the stream flow orifices during start-up.

Figure 4:
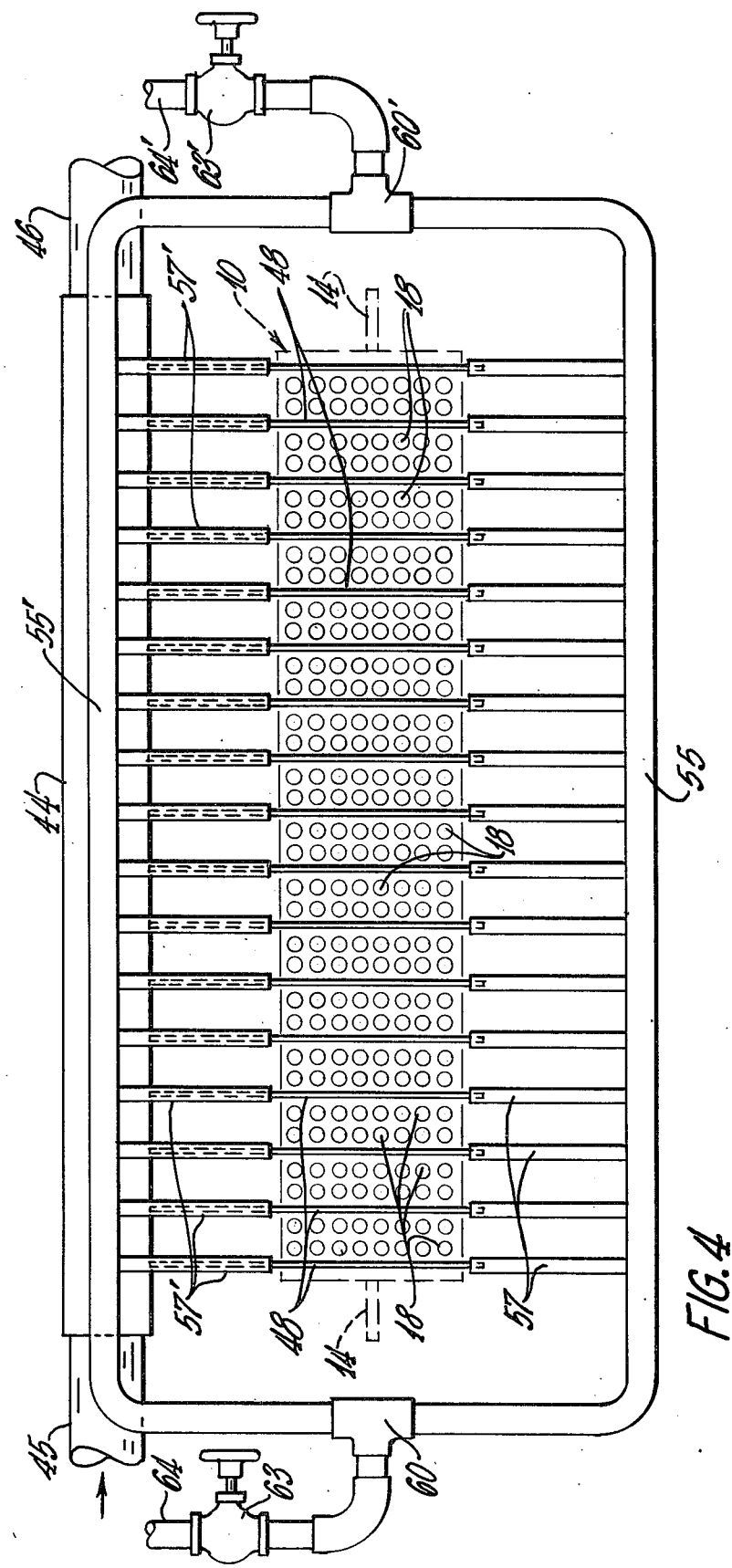
FIG. 4 is a schematic plan view of the stream flow section of the stream feeder and the gas distributing system. associated therewith.

While the method and apparatus of the invention provide a gaseous environment having particular utility in processing glass for forming fibers, it is to be understood that the method and apparatus may be utilized in the processing of other fiber-forming mineral materials.

Referring to the drawings in detail and initially to FIG. 1, there is illustrated a stream feeder or bushing 10 adapted to contain heat-softened mineral material, such as glass. In the embodiment illustrated, the stream feeder 10 is connected with a forehearth 12 which conveys molten glass from a melting furnace (not shown) into the stream feeder. If desired, heat-softened glass may be supplied to the stream feeder from a melter in which pieces or marbles of prerefined glass are reduced to a molten condition.

The stream feeder 10 is fashioned of a metal or alloy capable of withstanding the high temperatures of molten glass, such as an alloy of platinum and rhodium. The feeder 10 is provided at its ends with terminal lugs 14 for connection with current supply conductors (not shown) for passing electric current thorugh the feeder to maintain the glass at the desired temperature and viscosity for flowing streams of glass from the feeder.

The floor 16 of the feeder 10, usually referred to as a tip section, is formed with transverse rows of depending hollow projections or tips 18 providing passages or orifices 20 through which flow streams 21 of molten glass from the feeder. The glass streams immediately below the projections 18 are in the form of cones 22 of glass.

The glass streams 21 are attenuated into continuous fibers or filaments 24 by winding a strand of the fibers or filaments into a package. In the arrangement illustrated in FIG. 1, the continuous fibers or filaments are converged to form a multifilament strand 26 through the medium of a gathering device or shoe 28. The strand is wound into a package 30 upon a collector or forming tube 32 mounted upon a mandrel 33 rotated by a suitable motor (not shown) contained in a housing 35 of a winding machine of conventional construction.

As is conventional in winding textile fibers or filaments into a package, the strand is traversed lengthwise of the collector 32 to build the package of superposed layers of strand by a rotatable and reciprocable traverse means 37. The traverse means 37 may be of the character illustrated in the U.S. Pat. No. 2,391,870 to Beach which engages and oscillates the strand to effect a crossing of successive convolutions of the strand on the collector in a conventional manner. A lubricant, size or other coating material may be applied to the filaments by engaging them with a roll applicator 39 mounted by a receptacle 40 containing the size or coating material.

Disposed adjacent and lengthwise of the stream feeder 10 is a header and fin shield assembly 42. The assembly 42 is inclusive of a tubular header 44 having an inlet tube 45 and an outlet tube 46, the header accommodating a circulating heat-absorbing or heat-trasnferring medium, such as water. Welded or otherwise joined with the header is plurality of heat-transferring metal members, fins or fin shields 48.

It is preferred that the fins or members 48 in operating position are disposed with the upper edge 50 of each fin or member at a level slightly above the extremities of the tips or projections 18 as shown in FIGS. 2 and 3. Heat from the glass streams is transferred to the metal members or fins 48 and the circulating cooling medium or fluid in the header 44 conveys away the heat from the glass streams. Such arrangement is of conventional character and functions to convey sufficient heat away from the glass streams to render the glass of the streams at a proper viscosity to facilitate attenuation of the streams to fibers or filaments.

Textile glass compositions have heretofore included such constituents as boron and fluorine. The environment above the fin shields at the region of the feeder floor in prior fiber-forming operations is nearly quiescent or stagnant, the environment being composed of air, volatiles from the glass and their reaction products. If both boron and fluorine are present in the glass, both volatilize from the surface of the molten glass of the streams and the major chemical species present in the environment is boron fluoride from the reaction of the fluoride with boric oxide vapor.

This reaction reduces the vapor pressure of the boric oxide in the environment and accelerates its vaporization from the glass surface. The greater the depletion of the glass surface of boron by volatilization, the greater the viscosity and surface tension of the glass surface enhancing the stability of the cones of glass. The beads of glass forming at the tips of the orificed projections during start-up tend to be longer and thinner reducing the tendency for the beads to contact or hang up on the fin shields and cause flooding at the stream flow region of the feeder.

By reasons of environmental restrictions, textile glass compositions are being used having little or no fluorine in the compositions. If only boron is present in the glass, with little or no fluorine, the major chemical species in the stream flow environment is boric oxide $B_2O_3$. The equilibrium vapor pressure is low at the feeder tip temperatures so that volatilization from the glass very rapidly reaches equilibrium in the relatively quiescent or stagnant environment, and surface volatilization becomes very slow.

Hence, in the absence of a substance such as fluoride to reduce the vapor pressure of the gaseous boric oxide, the beads of glass formed at the tips of the orificed projections during start-up tend to be large in diameter and substantially shorter due to the lower viscosity and surface tension of the glass surface. The vapor pressure of the gaseous boric oxide decreases very rapidly with decreased temperature so that solid boric oxide $B_2O_3$ condenses on the fin shields or metal members resulting in a comparatively rapid build-up of boron compounds on the fin shields or metal members. The fiber-forming operation must be interrupted frequently to clean the fin shields. The invention is inclusive of a method and arrangement providing a gaseous environment between rows of depending projections on the stream feeder and above the metal members or fin shields, the environment being effective to eliminate or greatly reduce the accumulation on the fin shields or solids from the volatiles emitted from the glass and promote the formation of longer and thinner beads of glass during start-up to thereby reduce the tendency of flooding of glass over the stream flow area of the feeder.

The method includes the supplying or delivery of streams of gas of low volume and at low velocities between rows of the depending projections and above the fin shields providing continuous movement of the gas between the rows of projections for eliminating the stagnant air environment at such regions, the gas effecting reactions with the volatiles emanating from the glass to attain the above-mentioned results of preventing fin shield build-up and modifying the configuration of the beads of glass formed during start-up.

As shown in FIGS. 1, 3 and 4, manifold means comprising manifolds 55 and 55' are respectively disposed at each side of the stream feeder 10. Welded or otherwise secured to the manifold 55 are tubes or nozzles 57 for delivering streams of gas from the manifold 55. As shown in FIGS. 2, 3 and 4, each tube or nozzle 57 is disposed above and in lengthwise parallel relation with the adjacent fin shield 48.

The streams of gas from the tubes or nozzles 57 are directed above and lengthwise of the adjacent fin shields or metal members 48 and between transverse rows of orificed projections 18 depending from the feeder floor or tip section of the stream feeder 10.

As shown in FIGS. 2, 3 and 4, each tube or nozzle 57' connected with the manifold 55' is disposed above and in lengthwise parallel relation with the adjacent fin shield 48. The streams of gas from the tubes or nozzle 57' are directed above and lengthwise of the adjacent fin shields or metal members 48 and between transverse rows of orificed projections 18 depending from the feeder floor or tip section of the stream feeder 10.

As shown in FIGS. 3 and 4, the tubes or nozzles 57 and the tubes or nozzles 57' are in aligned relation transversely of the feeder so that the gas streams directed or delivered from the nozzles impinge one another. Through this arrangement the gas streams, moving between rows of projections and above and in lengthwise parallel relation with the fin shields or metal members 48, provide a continuously moving gaseous environment between rows of depending projections 18 thus obtaining a more uniform reaction of the gas with the volatiles from the glass.

With reference to FIG. 4, the manifold means 55 and 55' are joined by tee fittings 60 and 60'. The tee 60 is connected by tubular means with a valve or valve means 63, the valve 63 being connected by a pipe or tube 64 with the gas supply. The tee 60' is connected by tubular means with a valve or valve means 63', the valve 63' being connected by a pipe or tube 64' with the gas supply. The valves 63 and 63' regulate or control the flow of gas to the manifold means 55 and 55'.

It is found that a gas such as water vapor or steam at a temperature of above 250° F. or more provides a gas environment above the fin shields or metal members 48 and between rows of depending projections 18 on the stream feeder floor which is effective to attain the chemical reactions with volatiles emitted from a glass having boron therein but little or no fluorine to greatly reduce or minimize the accumulation or build-up of solids or condensation products on the fin shields or metal members 48 and to render the glass beads formed during start-up longer and thinner to reduce the tendency of flooding of the glass over the feeder floor or tip section.

If boron is present in the glass with little or no fluorine, the major chemical species in the environment is boric oxide. The water vapor or steam reacts with the boric oxide $B_2O_3$ as a gas to form a gas $HBO_2$, meta-boric acid, but this is an equilibrium reaction with the amount of boric oxide as a gas converted to a gaseous meta-boric acid increasing as the square root of the water vapor or steam concentration.

The equilibrium vapor pressure of the gas $HBO_2$ with $HBO_2$ as a solid is several orders of magnitude greater than than of the gas $B_2O_3$ with the solid $B_2O_3$. As the temperature is reduced the meta-boric acid $HBO_2$ as a gas further reacts with the steam or water vapor to form $H_3BO_3$, ortho-boric acid in gas form which has a relatively high vapor pressure at all temperatures above 250° F.

Therefore, the $H_3BO_3$ remains in gas form in the environment and eliminates or reduces the condensation of boric oxide on the metal members or fin shields 48 and promotes the formation of longer and thin beads of glass at the ends of the orificed projections 18 during start-up.

The velocity of the water vapor or steam delivered from the nozzles 57 and 57' is comparatively low, the maximum velocity, being about 170 centimeters per second. The volume of steam or water vapor of the streams delivered from the nozzles 57 and 57' is comparatively low. As an example, with a stream feeder floor section or bushing having 816 orificed projections or tips, the range of volume of water vapor or steam is from 500 to 3000 cubic centimeters per minute, or from 0.62 to 3.7 cubic centimeters per minute for each tip or projection.

The preferred volume of steam is 2.45 cubic centimeters per minute for each projection or tip, which is equivalent to 2000 cubic centimeters per minute for a stream feeder section or bushing having 816 orificed projections or tips.

Another gas that may be used as a gaseous environment above the fin shields 48 and between rows of orificed projections 18 to eliminate or minimize build-up of compounds on the fin shields or metal members and promote the formation of long thin beads of glass at start-up is a mixture of hydrogen fluoride and air in a ratio of one part hydrogen fluoride to about ten parts of air by volume.

The amount of hydrogen fluoride in the air and hydrogen fluoride mixture is about 0.075 cubic centimeters per minute for each orificed projection or tip 18. With this gas the reaction between boric oxide $B_2O_3$ in gas form and hydrogen fluoride HF in gas form results in the formation of boron fluoride $BF_3$ in gas form which remains in gas form and thus eliminates the deposition of boron compounds on the fin shields or metal members 48 and promotes the formation of longer and thinner beads of glass at the orificed projections during start-up. The amount of hydrogen fluoride employed in the gaseous environment is well within the amount allowed by the present environmental restrictions.

FIG. 5 illustrates schematically the configurations of glass forming at the exits of the orificed projections 18 during start-up operations. IN the use of a glass composition containing little or no fluorine and without the gas environment of the invention, the beads of glass illustrated at 68 in broken lines are short and of comparatively large diameters. This form of bead configuration promotes the tendency for the beads to contact one another and contact the metal members or fin shields causing the glass to flood across the floor of the stream feeder or bushign.

With the use of the gas environment of the invention above the fin shields and between rows of depending orificed projections, the beads formed of a glass composition having little or no fluorine are longer and of lesser diameter, such beads being indicated at 70. Beads of the latter character drop freely with no tendency to contact or hang up on the fins and cause flooding of the feeder floor.

It is found that a further advantage results from the use of the gas environment of the invention. The cones of glass 22 at the exits of the orificed projections 18 during attenuating operations are shorter and more stable than cones of glass in the absence of the gas environment.

It is important that the metal members or fin shields 48 are operated at a temperature above the condensation temperature of the compounds or materials formed as a result of the addition of the gas. Otherwise those reaction products would have a tendency to accumulate on the fin shields. With the water vapor injection system, for example, the fin shields or metal members 48 should be operated above 250° F.

Furthermore the gas is delivered above the level of the terminal of the depending projections and between rows of depending projections and oriented also so as to not directly impinge the floor or tip section 16 of the feeder 10. And since the volume and velocity of the gas is so relatively low it is believed there is no significant increase in the amount of heat transferred from the feeder or the fibers being formed. Therefore, the electrical power consumed by the feeder by the fiber forming process will not be significantly increased. It is believed to be, at maximum, less than a 1% increase in power consumed by the feeder 10.

The use of the invention in forming glass fibers particularly from glass compositions containing little or no fluorine enables the fiber-forming operation to be continued without interruption for much longer periods of time before it becomes necessary to clean the fin shields.

It is apparent that, within the scope of the invention, modifications and different arrangements may be made other than as herein disclosed, and the present disclosure is illustrative merely, the invention comprehending all variations thereof.

I claim:

1. The method of processing heat-softened boron-containing and substantially fluorine-free glass comprising flowing streams of the glass from orifices in depending projections arranged in rows on the floor of a stream feeder, attenuating the glass streams to fibers, conducting heat away from the glass streams through metal fin shields in parallel relation with the feeder floor and between the rows of glass streams, directing streams of gas reactable with boron-containing volatiles between the rows of depending projections in parallelism with the feeder floor and above the fin shields, reacting the gas of the streams with boron-containing volatiles from the glass resulting in a gaseous boron compound, and maintaining the temperature of the fin shields above the condensation temperature of the gaseous boron compound to substantially eliminate condensation of boric oxide on the fin shields.

2. The method according to claim 1 wherein the gas of the streams is selected from a group comprising steam or a mixture of air and hydrogen fluoride.

3. The method of processing heat-softened boron-containing glass comprising flowing streams of glass from rows of orificed projections depending from a stream feeder floor, attenuating the glass streams to fibers, conducting heat away from the glass streams through fin shields in parallelism with the feeder floor and between the glass streams of the rows, directing streams of steam horizontally between the rows of depending projections above the fin shields and above the terminals of the projections, reacting the steam with boron-containing volatiles emitted from the glass forming a boron compound in gas form, and maintaining the temperature of the fin shields above the condensation temperature of the boron compound for substantially eliminating condensation of boric oxide on the fin shields.

4. The method according to claim 3 wherein the volume of steam delivered for each orificed projection of the stream feeder is in a range of 0.62 cubic centimeters and 3.7 cubic centimeters per minute.

5. The method according to claim 3 wherein the velocity of the streams of steam is about one hundred seventy centimeters per second.

6. The method of processing heat-softened boron-containing and substantially fluorine-free glass comprising flowing streams of glass from orifices in depending projections arranged in rows on the floor of a stream feeder, attenuating the glass streams to fibers, conducting heat away from the glass streams through metal fin shields in parallel relation with the feeder floor and between the rows of glass streams, directing streams of gas comprising a mixture of hydrogen fluoride and air between the rows of depending projections in substantial parallelism with the feeder floor and above the fin shields, and reacting the gas of the streams with boron-containing volatiles emitted from the glass streams forming a gaseous boron compound, and maintaining the temperature of the fin shields above the condensation temperature of the gaseous boron compound to substantially eliminate condensation of boric oxide on the fin shields.

7. The method according to claim 6 wherein the mixture of hydrogen fluoride and air is in a ratio of about one part hydrogen fluoride to ten parts of air by volume.

8. The method according to claim 6 wherein the volume of the mixture of hydrogen fluoride and air of the streams for each depending orificed projection of the stream feeder is about 0.81 cubic centimeters per minute.

9. The method of processing molten glass containing boron but which is substantially fluorine-free comprising:

attenuating streams of the glass into filaments at a first zone;

conducting heat away from the streams by a member adjacent the streams at the first zone;

directing a first gas selected from the group consisting of steam and a mixture of hydrogen fluoride and air into the first zone in a reactable relationship with a second gas comprising boric oxide supplied to the first zone by the streams of glass to form a third gas; and maintaining the temperature of said member above the condensation temperature of the third gas to reduce the tendency of the second gas and third gas to condense upon said member.

10. The method of claim 9 wherein the third gas is a gas selected from the group consisting of meta-boric acid, ortho-boric acid, and boron fluoride.

11. The method of processing molten glass containing boron but which is substantially fluorine-free comprising:

supplying streams of molten glass;

attenuating the streams to filaments;

conducting heat away from the streams by a member adjacent the streams;

reacting a fluid selected from the group consisting of steam and a mixture of hydrogen fluoride and air at a zone wherein the streams are attenuated into filaments with a primary gas comprising boric oxide supplied by the streams of glass to form a secondary gas; and maintaining the temperature of said member above the condensation temperature of the secondary gas to reduce the tendency of the secondary gas to condense upon said member.

12. The method of claim 11 wherein the secondary gas is a gas selected from the group consisting of meta-boric acid, ortho-boric acid, and boron fluoride.

13. The method of processing heat-softened boron-containing glass comprising:

flowing streams of the glass from orifices arranged in rows on the floor of a stream feeder;

attenuating the glass streams to fibers;

conducting heat away from the glass streams through members adjacent the glass streams;

directing streams of gas reactable with boron-containing volatiles adjacent the heat-conducting members;

reacting the gas of the streams with boron-containing volatiles from the glass resulting in a gaseous boron compound; and maintaining the temperature of the heat-conducting members above the condensation temperature of the gaseous boron compound to substantially eliminate condensation of the compound on the members.

14. The method of processing heat-softened boron-containing glass comprising:

flowing streams of the glass from orifices arranged in rows on the floor of a stream feeder;

attenuating the glass streams to fibers;

conducting heat away from the glass streams through members in substantially parallel relation with the feeder floor and adjacent the glass streams;

directing streams of gas reactable with boron-containing volatiles in lengthwise relation with and adjacent the heat-conducting members;

reacting the gas of the streams with boron-containing volatiles from the glass resulting in a gaseous boron compound; and maintaining the temperature of the heat-conducting members above the condensation temperature of the gaseous boron compound to substantially eliminate condensation of the compound on the members.

* * * * *